United States Patent
Ou

(10) Patent No.: US 7,265,320 B2
(45) Date of Patent: Sep. 4, 2007

(54) METHOD AND SYSTEM FOR REDUCING SPATTER IN SHORT-CIRCUIT TRANSFER GAS SHIELDED ARC WELDING

(75) Inventor: Zhiming Ou, Being (CN)

(73) Assignee: Tsinghua University, Beijing, P.R. (CN)

( * ) Notice: Subject to any disclaimer, the term of this patent is extended or adjusted under 35 U.S.C. 154(b) by 67 days.

(21) Appl. No.: 10/571,801

(22) PCT Filed: Apr. 16, 2004

(86) PCT No.: PCT/CN2004/000367
§ 371 (c)(1),
(2), (4) Date: Mar. 3, 2006

(87) PCT Pub. No.: WO2005/030421
PCT Pub. Date: Apr. 7, 2005

(65) Prior Publication Data
US 2007/0051714 A1  Mar. 8, 2007

(30) Foreign Application Priority Data
Sep. 26, 2003  (CN) .............................. 03 1 34692

(51) Int. Cl.
*B23K 9/095* (2006.01)
(52) U.S. Cl. ........................... 219/137 PS; 219/130.21

(58) Field of Classification Search ........... 219/130.21, 219/130.31, 130.32, 130.33, 130.51, 137 PS
See application file for complete search history.

(56) References Cited

U.S. PATENT DOCUMENTS 4,546,234 A * 10/1985 Ogasawara et al. .... 219/137 PS
4,835,360 A *  5/1989 Parks et al. ............ 219/137 PS
6,906,284 B2 *  6/2005 Kim et al. ............. 219/130.21

FOREIGN PATENT DOCUMENTS

JP   59-199173   4/1983

* cited by examiner

*Primary Examiner*—Clifford C. Shaw
(74) *Attorney, Agent, or Firm*—Milde & Hoffberg LLP

(57) ABSTRACT

A method for reducing spatter in the short-circuit transfer gas shielded arc welding is disclosed. In this method, the resistance changing rate or the impedance changing rate of the welding circuit loop is detected for estimating the diameter of the short-circuit liquid bridge. When the diameter of the short-circuit liquid bridge shrinks to the preset value, the short-circuit bridge current is bypassed or shunted by the current closed loop feedback bypass control, and the current is decreased to a very low level rapidly and maintained this level until the bridge is broken, which results in a gentle and smooth drop transfer in a low current level condition, so as to avoid the mass spatter. Furthermore, a system for performing the method has also been disclosed.

8 Claims, 6 Drawing Sheets

METHOD AND SYSTEM FOR REDUCING SPATTER IN SHORT-CIRCUIT TRANSFER GAS SHIELDED ARC WELDING

FIELD OF THE INVENTION

The invention relates to the field of the welding process and welding equipment, especially to a method for reducing spatter in short-circuit transfer gas shielded arc welding and a system for performing the method.

BACKGROUND OF THE INVENTION

Short-circuit transfer gas shielded arc welding, which is a gas shielded consumable electrode arc welding process, includes carbon dioxide gas shield arc welding, mixed gas shield arc welding and argon shielded consumable electrode arc welding, in which a melting drop is deposited from a welding wire or electrode onto a workpiece in a short-circuit transfer mode. Because of it's high productivity, low cost, small welding distortion, popular adaptability, easy to be employed in all-position welding and easy to be automatized, short-circuit transfer gas shield arc welding has wide impact in industry applications. The major disadvantage of short-circuit transfer gas shield arc welding is the huge amount of the welding spatter, which deteriorates the working condition and environment, reduces the welding wire deposit efficiency, affects the arc stabilization and lowers the welding quality.

A typical short-circuit transfer gas shielded arc welding machine comprises a welding power source, a welding wire feeding mechanism and a gas shield system. In the welding process, when the metal drop which is melted from the welding wire is shorted circuit with the workpiece, the short-circuit liquid bridge is formed, and the current in the welding circuit loop is increased consequently. Under the electromagnetic force of the current, the gravity and the surface tension of the melting metal, the liquid bridge shrinks and its diameter becomes smaller and smaller. When the diameter of liquid bridge reaches a critical value, the liquid bridge is broken by the explosion under a very high peak current and the arc state is restored again. In traditional spatter reduction methods, a reactance or electrical reactor is connected in series into the welding power source to restrict the short-circuit current increasing rate, so that the peak current and welding spatter can be restrained. However, to ensure the normal transfer of the melting drop, the shrinkage and transfer of the short-circuit liquid bridge also depend on a very high short-circuit current, and the traditional method still creates significant spatter.

Extensive research was carried out in recent years all around the world. It has been concluded that the spatter is due to the explosion of the short-circuit liquid bridge under the high current during the later period of the short-circuit. Most of the spatter reduction techniques can be classified into the following four categories:

The first category consists in simply changing the gas components, adopting the electrical reactor, or controlling the current increasing rate of the welding circuit loop. By these simple methods, the spatter can be only reduced to a limited degree.

The second category consists in the control of welding wire feeding movement, wherein the liquid bridge is broken by instantaneous drawing back the welding wire, which means the electromagnetic force is substitute by the mechanical force to carry out the melting drop transfer. But the welding wire movement delay in the feeding pipe enables it hardly synchronized with the liquid bridge shrinkage process and the current control process, which makes these methods theoretical but impractical.

The third category consists in the control of the welding current waveform. The process of the melting drop transfer happens randomly, rapidly, and with great diversity. For this reason, the preset current waveform cannot fit each course of the melting drop transfer in real time. Further more, improper waveform control will reduce the arc length self-adjustment property and arc stability, and also affect the penetration, formation and quality of the welding bead.

The fourth category consists in the current control of the power source by monitoring the course of the melting drop transfer. Technically, it is very difficult to detect the state of the short-circuit liquid bridge, so regular detection methods can hardly monitor the course of the shrinkage of the liquid bridge. Some methods detect the voltage, the voltage changing rate and the resistance between the contact tip and the workpiece to describe the diameter of the liquid bridge. But the parameters mentioned above do not represent the exact value of the diameter of the liquid bridge, because all the above detection values include the disturbance and the effect of the liquid bridge current and the resistance of the welding wire extension (the wire length between the contact tip and the top of the liquid bridge).

Some methods (for example, as disclosed in JP 59-199173) try to use the resistance changing rate between the contact tip and workpiece to represent the state of liquid bridge shrinkage. However, connecting sensor cables to the welding torch and the workpiece is not a practical way in mass production. The sensor cable is easily to be damaged, short-circuited, cut or disabled in on-site environment by the high temperature conditions of the welding arc and the welding workpiece. For most of the semi-automatic welding machine used in industry, it is also very difficult to connect the sensor cable to the contact tip in the welding torch. So, it is widely concerned that how the diameter and shrinkage state of the short-circuit liquid bridge can be accurately measured and detected directly from the output of the welding power source. Concerning the method for the reducing of the liquid bridge current, due to a huge DC reactor inductance is connected in series with the welding power source, which is essential to restrict the output current increasing rate, all the current controls before the DC reactor inductance are ineffective because of the insufficient dynamic response. Due to the DC reactor inductance, none of the controls before the DC reactor inductance can depress the liquid bridge current from about 1000 A to a very low level in about 100 microseconds under the short-circuit condition. The above current control response is much slower than the liquid bridge shrinkage and explosion process. Some other methods attempt to control the later period current of the short-circuit liquid bridge by a power module in series connection in the welding circuit loop. The DC reactor inductance mentioned above would cause an extreme high over voltage on the control module under the fast current changing rate. Contrarily, if the liquid bridge current decreases not so fast, the liquid bridge current cannot be reduced in a short time. Further more, the control module in series connection in the welding circuit loop will cause considerable power dissipation.

SUMMARY OF THE PRESENT INVENTION

The purpose of the present invention is to provide a method to reduce the spatter in short-circuit transfer gas shielded arc welding.

In this method, the resistance changing rate or the impedance changing rate of the welding circuit loop is detected for estimating the diameter of the short-circuit liquid bridge. When the resistance changing rate or the impedance changing rate increases and reaches the preset threshold value which indicates the liquid bridge diameter has shrunk and decreased to the critical diameter, a bypass circuit branch connected in parallel to the welding circuit loop is turned on, to bypass the liquid bridge current rapidly, so as to decrease the liquid bridge current to a low level and keep it at this level until the liquid bridge is broken, which results in a gentle and smooth transfer in a low current level condition In this method, the turn-on of the bypass circuit branch is determined on the basis of the resistance changing rate of the welding circuit loop, and the resistance changing rate is detected and calculated by the following way: the output voltage of the welding power source is subtracted by a term which is equal to the equivalent voltage drop of welding cable inductance; then the value obtained by said subtracting is divided by the value of the current of the welding circuit loop, and the value obtained by said dividing is differentiated with respect to time, with the result of the differentiating being the resistance changing rate of the welding circuit loop.

In this method, the turn-on of the bypass circuit branch is determined on the basis of the impedance changing rate of the welding circuit loop, and the impedance changing rate is detected and calculated by the following way: the output voltage of the welding power source is divided by the value of the current of the welding circuit loop, and the value obtained by the dividing is differentiated with respect to time, with the result of the differentiating being the impedance changing rate of the welding circuit loop.

In this method, when the method is applied to a controlled rectifier style welding power source, a second-order differential signal of the current of the welding circuit loop with respect to time is used by a short-circuit bridge state detecting and estimating subsystem, for blocking the electric interference to the short-circuit bridge state detecting and estimating subsystem caused by the phase current changing from one phase to another or the turn-on of a controlled rectified device.

In this method, wherein in the bypass control process of the short-circuit liquid bridge current, a current closed loop feedback bypass control mode with the liquid bridge current as a feedback quantity, is used for reducing and controlling the current in the later period of the liquid bridge and in the earlier period of the arc time after the bridge is broken.

In this method, wherein a capacitor is connected in series into the bypass circuit branch of a closed loop feedback bypass control subsystem for the short-circuit liquid bridge current; the capacitor is charged before the turn-on of the bypass circuit branch, so as to provide a sufficient voltage for accelerating the bridge current decreasing rate; and when the bridge current reaches a steady state, the voltage of the capacitor provides a power module of the bypass circuit branch with a sufficient voltage for maintaining the power module in a linear amplifying state, so as to control the liquid bridge current during the bypass control period.

In this method, an over-voltage protection circuit, which is connected in parallel to the power module 2-1 of the bypass circuit branch, is composed of two absorption circuits which have both capacitances and discharge time constants in huge difference for absorbing the over voltage caused by the circuit transition process of the normal drop transfer and the turn-on/off of the bypass circuit branch and the over voltage caused by the circuit transition process of the arc starting and accidental short-circuit. For the protection absorption circuit, which absorbs the over voltage caused by the circuit transition process of the normal drop transfer and the turn-on/off of the bypass circuit branch, the following way is used to select the capacitance value and the circuit parameters: after absorbing the energy released from the inductance $L_1$ of the welding power source during the circuit transition process of the normal drop transfer and the turn-on/off of the bypass circuit branch, the capacitor voltage does not exceed the safe voltage of power module 2-1, and the discharge time constant of the protection circuit does not exceed the ⅓ of the drop transfer cycle time or the bypass activation cycle time. For the absorption protection circuit which absorbs the over voltage caused by the circuit transition process of the arc starting or accidental short-circuit, the following way is used to select capacitance value and the circuit parameters: after the absorbing the energy released from the inductance $L_1$ of the welding power source during the circuit transition process of the arc starting and accidental short-circuit, the capacitor voltage does not exceed the safe voltage of module 2-1, and the discharge time constant of the protection circuit should be much greater than the normal drop transfer cycle time or the bypass activation cycle time, such as 3 times or more, and the discharge time constant of the protection circuit does not exceed the ⅓ of the interval time of accidental short-circuit including the short-circuit for arc starting.

In the present invention, a system for performing the method, comprises two subsystems, i.e., the short-circuit liquid bridge state detecting and estimating subsystem and the closed loop feedback bypass control subsystem for the short-circuit liquid bridge current; wherein the short-circuit liquid bridge state detecting and estimating subsystem comprises a short-circuit/arc condition detector, a liquid bridge current sensor, a first differentiator, a voltage adder, a division operator, a second differentiator, a short-circuit liquid bridge diameter pre-setter, a comparator, a third differentiator, a fourth differentiator, a trigger, and a logic circuit; the output of the short-circuit liquid bridge state detecting and estimating subsystem turns on or off the closed loop feedback bypass control subsystem for the short-circuit liquid bridge current with an electrical switch; and the closed loop feedback bypass control subsystem for the short-circuit liquid bridge current comprises a liquid bridge current pre-setter, the liquid bridge current sensor, an error signal correction amplifier, the electrical switch, a power module driver, the bypass circuit branch, and the welding circuit loop with the short-circuit liquid bridge.

In the present invention, the resistance changing rate or the impedance changing rate of the welding circuit loop is detected for estimating the liquid bridge diameter during welding. When the liquid bridge diameter has shrunk and decreased to the critical diameter, the liquid bridge current is bypassed or shunted by the bypass circuit branch, and decreased to a low level rapidly. It results in a gentle and smooth drop transfer in a low current level condition and avoids the liquid bridge explosion under a high current level and mass spatter.

BRIEF DESCRIPTION OF DRAWINGS

FIG. 9 is a circuit diagram of the closed loop feedback bypass control subsystem for the short-circuit liquid bridge current.

PREFERRED EMBODIMENTS OF THE INVENTION

Figure 1:
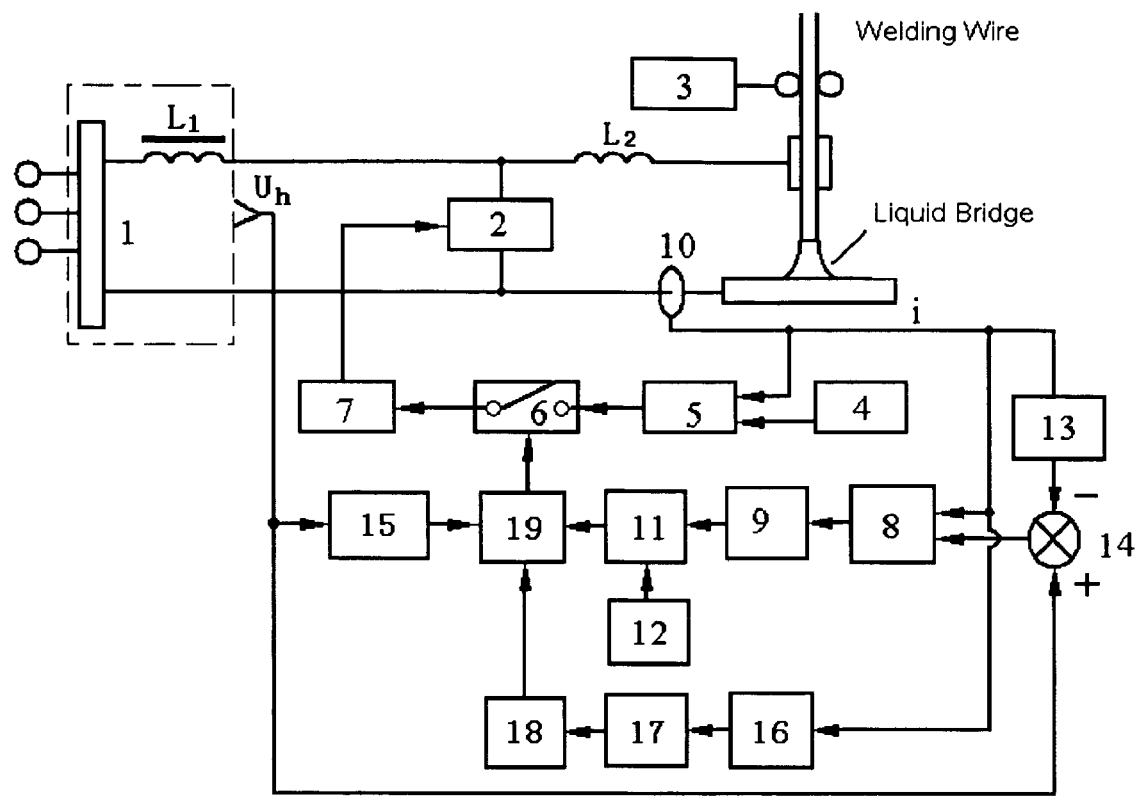
FIG. 1 is a block diagram of the system of the present invention.

The present invention is embodied particularly by the following technical solution.

A method for reducing spatter in short-circuit transfer gas shielded arc welding is provided. In this method, the resistance changing rate or the impedance changing rate of the welding circuit loop is detected for estimating the diameter of the short-circuit liquid bridge, When the resistance changing rate or the impedance changing rate of the welding circuit loop increases to a preset threshold value, which indicates that the liquid bridge diameter has shrunk and decreased to a critical value, a bypass circuit branch connected in parallel to the welding circuit loop is turned on, to bypass the liquid bridge current rapidly, so as to decrease the liquid bridge current to a low level and keep it at this level until the liquid bridge is broken, which result in a gentle and smooth transfer of the liquid bridge in a low current level condition to reduce the welding spatter.

In this method, the turn-on of the bypass circuit branch is determined on the basis of the resistance changing rate of the welding circuit loop. The resistance changing rate is detected and calculated by the following way: the output voltage of the welding power source is subtracted by a term which is equal to the equivalent voltage drop of welding cable inductance. Then the value obtained by said subtraction is divided by the value of the current of the welding circuit loop, and the value obtained by said dividing is differentiated with respect to time, with the result of the differentiating being the resistance changing rate of the welding circuit loop.

In this method, the turn-on of the bypass circuit branch is determined on the basis of the impedance changing rate of the welding circuit loop. The impedance changing rate is detected and calculated by the following way: the output voltage of the welding power source is divided by the value of the current of the welding circuit loop, and the value obtained by the dividing is differentiated with respect to time, with the result of the differentiating being the impedance changing rate of the welding circuit loop.

In this method, when the method is applied to a controlled rectifier style welding power source, a second-order differential signal of the current of the welding circuit loop with respect to time is used by a short-circuit bridge state detecting and estimating subsystem, for blocking the electric interference to the short-circuit bridge state detecting and estimating subsystem caused by the phase current changing from one phase to another or the turn-on of a controlled rectified device.

In this method, during the bypass control process of the short-circuit liquid bridge current, a current closed loop feedback bypass control mode with the bridge current as the feedback quantity, is used for reducing and controlling the current in the later period of the liquid bridge and the earlier period of the arc time after the bridge is broken.

In this method, a capacitor 2-2 is connected in series into the bypass circuit branch 2 of a closed loop feedback bypass control subsystem for the short-circuit liquid bridge current. The capacitor 2-2 is charged before the turn-on of the bypass circuit branch 2, so as to provide a sufficient voltage for accelerating the bridge current decreasing rate; and when the bridge current reaches a steady state, the voltage of the capacitor provides a power module 2-1 of the bypass circuit branch with a sufficient voltage for maintaining the power module in a linear amplifying state, so as to control the liquid bridge current during the bypass control period.

In this method, an over-voltage protection circuit, which is connected in parallel to the power module 2-1 of the bypass circuit branch, is composed of two absorption circuits which have both capacitances and discharge time constants in huge difference for absorbing the over voltage caused by the circuit transition process of the normal drop transfer and the turn-on/off of the bypass circuit branch and the over voltage caused by the circuit transition process of the arc starting and accidental short-circuit. For the protection absorption circuit which absorbs the over voltage caused by the circuit transition process of the normal drop transfer and the turn-on/off of the bypass circuit branch, the following way is used to select the capacitance value and the circuit parameters: After absorbing the energy released from the inductance $L_1$ of the welding power source during the circuit transition process of the normal drop transfer and the turn-on/off of the bypass circuit branch, the capacitor voltage does not exceed the safe voltage of power module 2-1, and the discharge time constant of the protection circuit does not exceed the ⅓ of the drop transfer cycle time or the bypass activation cycle time. For the absorption protection circuit which absorbs the over voltage caused by the circuit transition process of the arc starting or accidental short-circuit, the following way is used to select capacitance value and the circuit parameters: After the absorbing the energy released from the inductance $L_1$ of the welding power source during the circuit transition process of the arc starting and accidental short-circuit, the capacitor voltage does not exceed the safe voltage of module 2-1, and the discharge time constant of the protection circuit should be much greater than the normal drop transfer cycle time or the bypass activation cycle time, such as 3 times or more, and the discharge time constant of the protection circuit does not exceed the ⅓ of the interval time of accidental short-circuit including the short-circuit for arc starting.

In the present invention, a system for performing the method is disclosed. The system comprises two subsystems, i.e., a short-circuit liquid bridge state detecting and estimating subsystem and a closed loop feedback bypass control subsystem for the short-circuit liquid bridge current; the short-circuit liquid bridge state detecting and estimating subsystem comprises a short-circuit/arc condition detector 15, a liquid bridge current sensor 10, a first differentiator 13, a voltage adder 14, a division operator 8, a second differentiator 9, a short-circuit liquid bridge diameter pre-setter 12, a comparator 11, a third differentiator 16, a fourth differentiator 17, a trigger 18, and a logic circuit 19; the output of the short-circuit liquid bridge state detecting and estimating subsystem turns on or off the closed loop feedback bypass control subsystem for the short-circuit liquid bridge current with an electrical switch 6; and the closed loop feedback bypass control subsystem for the short-circuit liquid bridge current comprises a liquid bridge current pre-setter 4, the liquid bridge current sensor 10, an error signal correction amplifier 5, the electrical switch 6, a power module driver 7, the bypass circuit branch 2 and the welding circuit loop with the short-circuit liquid bridge.

The spatter reduction method of the present invention is performed by the short-circuit liquid bridge state detecting and estimating subsystem and the closed loop feedback bypass control subsystem for the short-circuit liquid bridge current, shown in FIG. 1. The turn-on or turn-off of the closed loop feedback bypass control subsystem for the short-circuit liquid bridge current is controlled by the short-circuit liquid bridge state detecting and estimating subsystem via the electronic switch 6. The short-circuit liquid bridge state detecting and estimating subsystem estimates the short-circuit liquid bridge state or diameter by detecting the resistance changing rate or the impedance changing rate of the welding circuit loop.

The bypass circuit branch 2 is connected to the welding power source 1 in parallel. When it is detected that the liquid bridge has shrunk to the definite preset threshold value, which indicates that the liquid bridge diameter is decreased to the critical value, the bypass circuit branch 2 is turned on, to bypass or shunt the most of the liquid bridge current by the bypass circuit branch and enable the liquid bridge to be broken gently and smoothly under a very low level current, so as to avoid the explosion of the short-circuit liquid bridge under a high level current. With the DC iron-core reactor inductance $L_1$ connected in series, the output current changing rate of the welding power source is restricted, and the period of the bypass control is very short. Therefore, there is not much change in the output current of the welding power source during the bypass control period, the dynamic response of the closed loop feedback bypass control subsystem for the short-circuit liquid bridge current in this method is independent of the inside characteristic of the welding power source, and the liquid bridge current can be reduced rapidly.

Figure 2:
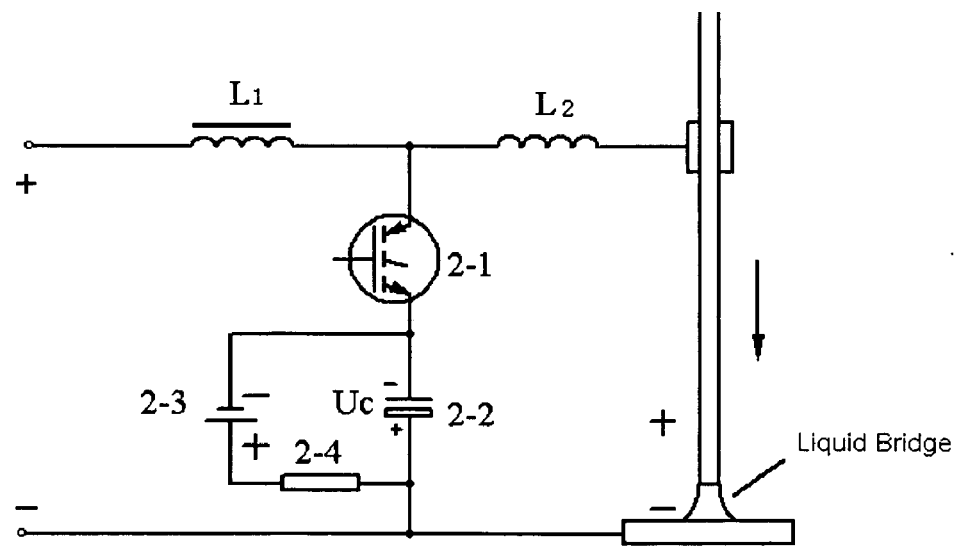
FIG. 2 is a circuit structure of the bypass circuit branch.

The circuit structure of the bypass circuit branch is shown in FIG. 2. From the circuit principle, it can be seen that the result and dynamic response of the control of shunting or bypassing the bridge current in parallel connection are dependent upon the impedance of the bypass circuit branch and the voltage of the circuit loop. The liquid bridge resistance is very small, usually about 10 to 100 milliohms, and the bridge voltage drop is about 1~2 volts when the bridge shrinks to the later period. The saturation resistance and saturation voltage of the semiconductor power control device are also within about the same range as the liquid bridge resistance and voltage. Since the saturation resistance or saturation voltage of a typical power semiconductor power device is correspondingly not small enough compared with the bridge resistance or voltage, if the bypass circuit branch is only composed of the semiconductor power device, the result of shunting or bypassing control will be deficient, and the bridge current cannot be bypassed and deceased to a very low level. Further more, if the voltage of welding cable resistance and the voltage of the welding wire extension can be ignored, then in the bridge current bypass transit response period, the voltage difference between the short-circuit liquid bridge voltage and the power device voltage determines the current changing rate di/dt (negative) which restricted by the welding cable inductance $L_2$. The circuit relationship can be shown below:

$$U_T - U_Y = L_2 \frac{di}{dt},$$

where $U_T$ is the voltage of the power device; and
$U_Y$ is the voltage of short-circuit liquid bridge.

Since the absolute value of the above voltage difference is very small, the decreasing rate of the bridge current in the bypass control period is also very low. However, as the bypass control period is very short, a very quick response is required in the bypass control period to decrease the bridge current to the low level before the bridge explosion.

In order to improve the efficiency and the transit response of the bypass control, in the present invention, the structure of the bypass circuit branch is designed as shown in FIG. 2. A charged capacitor 2-2 is connected in series with the semiconductor power device 2-1. Before the bypass control, the capacitor 2-2 is charged by a DC power 2-3, and a resistance 2-4 restricts the charging current. With the charged capacitor 2-2, a capacitor voltage is added to the bypass circuit branch, the relationship of the circuit loop being expressed below:

$$U_T - U_Y - U_c = L_2 \frac{di}{dt},$$

where $U_c$ is the voltage of the charged capacitor 2-2.

With the presence of the charged capacitor 2-2, the absolute value of the current changing rate di/dt and the transit response of the bypass control subsystem become much higher than before, so the bridge current can be decreased to a very low anticipant value in a very short time.

Because the capacitor 2-2 is connected in series into bypass circuit branch and is charged before the bypass circuit branch is turned on, it will quicken the bridge current decreasing rate during the turn-on of the bypass circuit branch. After the bridge current decreases to a stable value, the capacitor 2-2 supplies enough voltage to the power module 2-1 of the bypass circuit branch, and enables the power module to work in a linear amplifying state so that the bridge current is still under control during the bypass control period.

In order to avoid the current impact on the melt pool during the arc restarting after short-circuit drop transfer, the bypass control period of the subsystem must across the short-circuit state and the arcing state, and the resistance difference of the welding circuit loop in above two states is very large. Even in the short-circuit state, because the diameter of short-circuit bridge changes during the bridge shrinking, the changing range of short-circuit resistance of the welding circuit loop is also quite large. In order to make the current control of the bypass control subsystem for the short-circuit liquid bridge current to be adapted to the condition of short-circuit resistance extreme changing of the welding circuit loop and to achieve an exact and rapid current control, a current closed loop feedback control mode with the short-circuit bridge current as the feedback quantity is adopted in the present invention. The control mode enables the equivalent resistance of the power module varies with the changing of the short-circuit resistance of the welding circuit loop, and enables the currents in both the later period of short-circuit bridge and the initial period of the arc restarting to be controlled to a low level. That is to say, it can rapidly decrease the short-circuit bridge current to the same very low level and maintain it until the bridge broken, as well as avoid the arc breaking down during the arc restarting period. The turn-on and the turn-off of the bypass control subsystem are controlled by the short-circuit liquid bridge state detecting and estimating subsystem via the electronic switch 6. When the short-circuit liquid bridge shrinks to a special state (corresponding to a certain bridge diameter), the closed loop feedback bypass control subsystem for the short-circuit liquid bridge current is turned on and activated, until the short-circuit liquid bridge disconnects gently and the arc restarting finishes, so as to avoid the spatter caused by liquid bridge explosion during the liquid bridge broken and decrease the current impact during the arc restarting.

Figure 3:
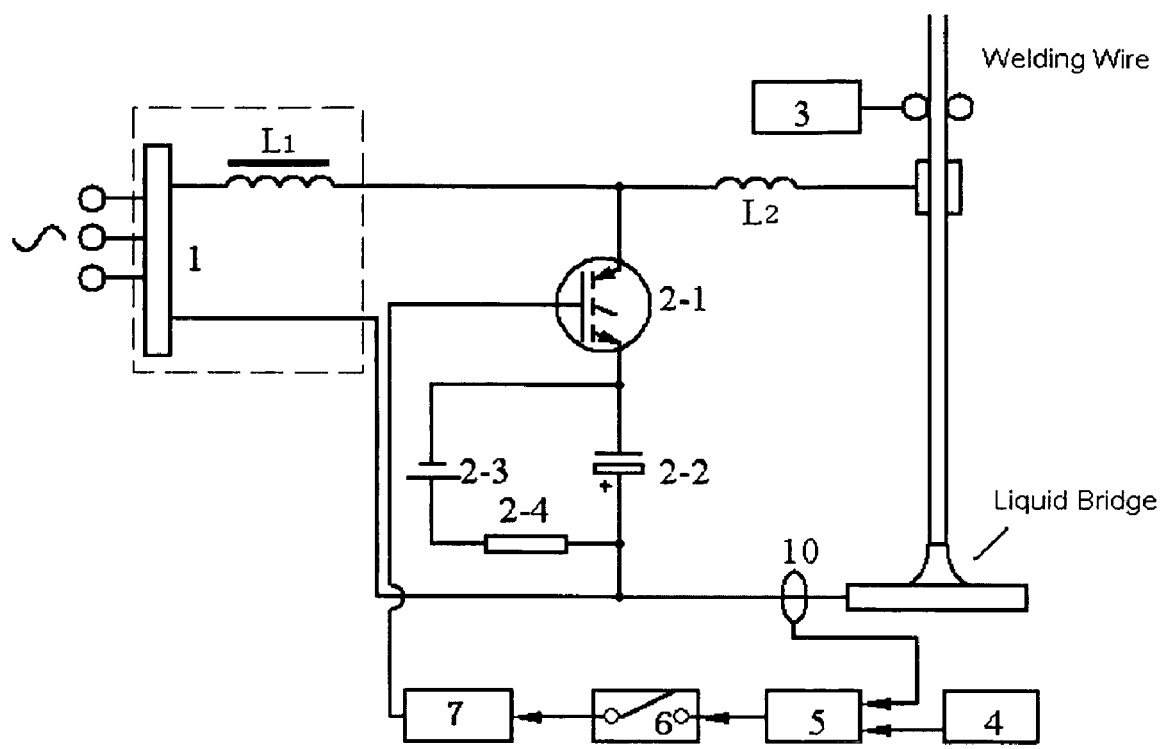
FIG. 3 is a block diagram of the closed loop feedback bypass control subsystem for the short-circuit liquid bridge current.

The closed loop feedback bypass control subsystem for the short-circuit liquid bridge current is shown in FIG. 3, wherein the current bypass control process uses the current closed loop feedback bypass control mode with the bridge current as the feedback quantity. Its principle will be described below.

In the later period of the short-circuit liquid bridge shrinking, when the diameter of the short-circuit liquid bridge shrinks to the critical preset value, the short-circuit liquid bridge state detecting and estimating subsystem turns on the electronic switch 6, and the closed loop feedback bypass control subsystem for the short-circuit liquid bridge current is in the closed loop feedback control state. The value of the real time current of the short-circuit liquid bridge is obtained from the current sensor 10, and is compared with the preset value 4 of the short-circuit liquid bridge current. The error signal correction amplifier 5 compares the value of the real current with the preset value, amplifies the difference of them and makes a correction control, then the power module 2-1 is driven by the driver 7 and the bypass circuit branch is turned on and shunts or bypasses the liquid bridge current, which enables the short-circuit liquid bridge current to be decreased rapidly and finally to reach the preset value of the short-circuit liquid bridge current. It can maintain the liquid bridge current constantly under the condition of short-circuit liquid bridge resistance changing in a large range, that is, a closed loop feedback control process of short-circuit liquid bridge current is available. The preset value 4 for the closed loop feedback bypass control subsystem for the short-circuit liquid bridge current should be about 50 A.

The turn-on the closed loop feedback bypass control subsystem for the short-circuit liquid bridge current is triggered by the short-circuit liquid bridge state detecting and estimating subsystem. The triggering moment of the bypass control subsystem is very critical and important. Bypassing the current earlier will result in that the liquid bridge losses the electromagnetic shrinking force generated by the liquid bridge current. It will affect the normal shrinkage and transfer process of the liquid bridge, and disturb the transfer of melting drop and the normal welding process. If the closed loop feedback bypass control subsystem for the short-circuit liquid bridge current is triggered or turned on too late, the opportunity to practice the bypass control will be missed, which disables the spatter reducing control and the short-circuit liquid bridge will be exploded by a high current. Because the short-circuit liquid bridge shrinkage process is an accelerating process, the tiny difference of the triggering moment of the bypass control subsystem will lead to entirely different results.

It has been confirmed in previous research that the liquid bridge shrinkage process is an accelerating process, because as the diameter of the liquid bridge being reduced, the electromagnetic force and the surface tension are increased. The liquid bridge diameter corresponds to the liquid bridge shrinking rate or the resistance changing rate of the liquid bridge, so the liquid bridge diameter can be represented by its resistance changing rate in the shrinkage process.

Although the resistance of the liquid bridge is only a small part of the resistance of the welding circuit loop, however, in the later period of the liquid bridge shrinkage, the liquid bridge shrinking rate is very high and the shrinking time is very short, the resistance changing rate of the welding circuit loop is determined by the resistance changing rate of the liquid bridge, because the resistances of the other components in the welding circuit loop, e.g. the welding cable resistance and the wire extension resistance, have no or little changing rate. For this reason, the resistance changing rate of the welding circuit loop can be used as the liquid bridge resistance changing rate, even the short-circuit liquid bridge resistance is only a small part of the total resistance of the welding circuit loop. Accordingly, in the present invention the resistance changing rate of the welding circuit loop is used to represent the liquid bridge diameter during shrinkage process of the liquid bridge.

Figure 4:
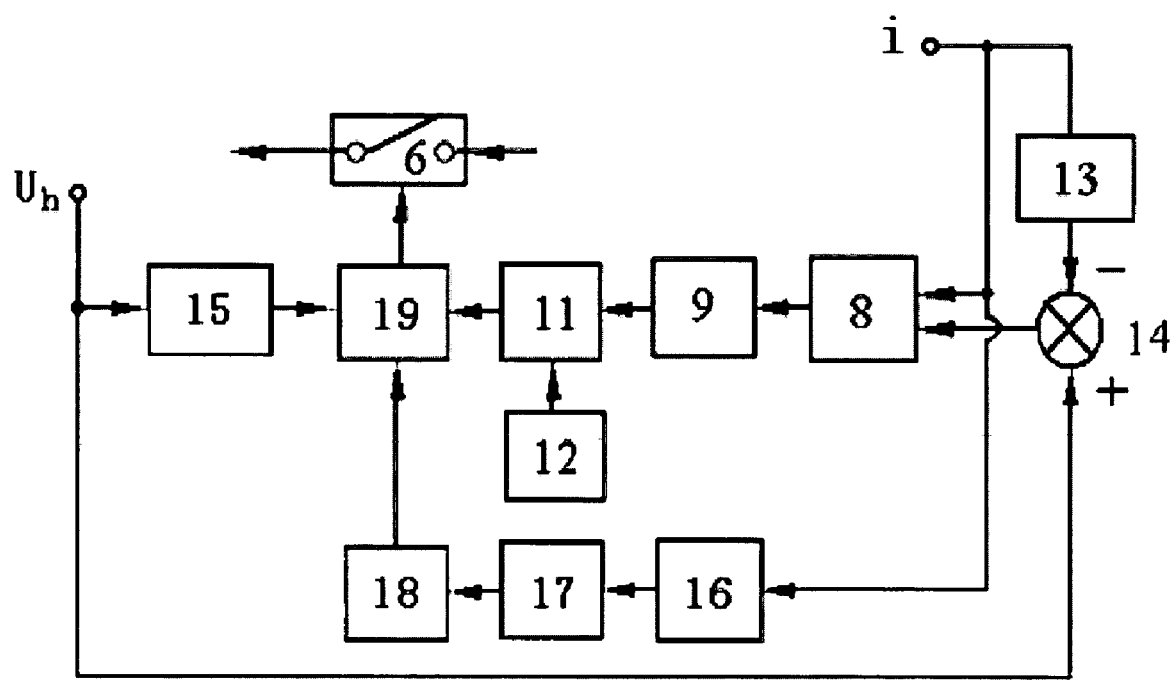
FIG. 4 is a block diagram of the short-circuit liquid bridge state detecting and estimating subsystem.

The short-circuit liquid bridge state detecting and estimating subsystem is shown in FIG. 4. It comprises the short-circuit/arc condition detector 15, the liquid bridge current sensor 10, the first differentiator 13, the voltage adder 14, the division operator 8, the second differentiator 9, the short-circuit liquid bridge diameter pre-setter 12, the comparator 11, the third differentiator 16, the fourth differentiator 17, the trigger 18 and the logic circuit 19.

Figure 5:
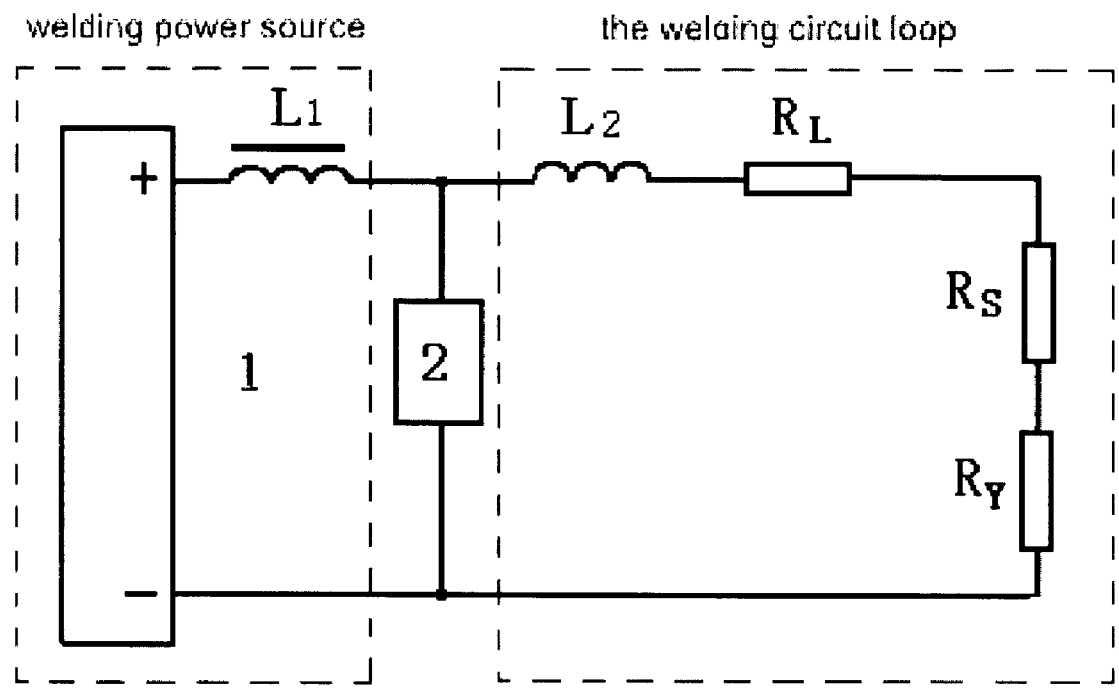
FIG. 5 is an equivalent circuit diagram of the welding circuit loop.

The short-circuit liquid bridge current is measured by the liquid bridge current sensor 10. The equivalent resistance voltage drop of the welding circuit loop $U_R$ is quantified by equivalent calculation. In FIG. 4, the equivalent resistance voltage drop $U_R$ is the difference between the welding power source output voltage $U_h$ and the current differential term. According to the principle of the short-circuit liquid bridge state detecting and estimating subsystem, in order to get the equivalent resistance of the welding circuit loop, the division operator should take the current and equivalent resistance voltage drop of the welding circuit loop as it's inputs. In the present invention, voltage detecting wires are connected to two terminals of the welding power source inside the welding machine, and the value of the resistance voltage drop of the welding circuit loop is calculated by deducting a voltage value term that equal to the welding cable voltage drop from the welding power source output voltage. The equivalent circuit diagram of the welding circuit loop is shown in FIG. 5, wherein reference numeral 1 represents the welding power source which includes a DC power supply and an iron core inductance, and reference numeral 2 represents the bypass circuit branch provided by the present invention. The welding circuit loop is composed of welding cables, welding wire extension and the liquid bridge, and their parameters include welding cable inductance $L_2$, welding cable resistance $R_L$, welding wire extension (the wire extension length from the end of the conduct tip to the top of the liquid bridge) resistance $R_S$ and liquid bridge resistance $R_Y$. The resistance of the whole welding circuit loop is the sum of all the resistance as set below: $R_h=R_L+R_S+R_Y$.

The difference between the output voltage of the welding power source and the voltage drop of the equivalent resistance of the welding circuit loop is the voltage drop of welding cable's inductance. The inductance voltage drop, which is represented by $$L_2 \frac{di}{dt},$$

is proportional to the current changing rate di/dt. The output voltage of the welding power source $U_h$ is made up by the components below:

$$U_h = L_2 \frac{di}{dt} + iR_L + iR_s + iR_Y$$

wherein the equivalent resistance voltage drop $U_R$ of the welding circuit loop is:

$$U_R = iR_L + iR_S + iR_Y$$

where $R_L$ is the welding cable resistance,
$R_S$ is the welding wire extension resistance, and
$R_Y$ is the liquid bridge resistance, and therefore, $$U_h = U_R + L_2 \frac{di}{dt} \text{ or } U_R = U_h - L_2 \frac{di}{dt}$$

If a term $$R_1 C_1 \frac{di}{dt},$$

which is equal to $$L_2 \frac{di}{dt}$$

quantitatively, is deducted from the welding power source output voltage $U_h$, the remaining is exactly equal to the voltage drop of the welding circuit loop equivalent resistance $U_R$.

If $R_1 C_1 \frac{di}{dt} = L_2 \frac{di}{dt}$, then $U_R = U_h - R_1 C_2 \frac{di}{dt}$ Although the voltage detecting sensor is connected to the welding power source output terminals, the equivalent resistance voltage drop can be obtained by calculation. In FIG. 4, the current passes the first differentiator 13, and a term $$R_1 C_1 \frac{di}{dt},$$

which is proportional to the differential of the current with respect to time, can be calculated. The voltage drop of equivalent resistance of the welding circuit loop can be calculated by deducting the term $$R_1 C_1 \frac{di}{dt}$$

from welding power source output voltage.

The liquid bridge current and the equivalent resistance voltage drop of the welding circuit loop are supplied into the division operator 8, to carry out the calculation of $R_h=U_R/I$. The output of the division operator is the equivalent resistance of the welding circuit loop R, which is supplied to the second differentiator 9 and the resistance changing rate of the welding circuit loop $$\frac{dR_h}{dt}$$

can be calculated out. The comparator 11 compares the resistance changing rate and the preset value from 12. When the resistance changing rate of the welding circuit loop reaches the preset value, it indicates that the liquid bridge diameter becomes small enough and it is ready to carry out the current bypass control. The comparator will then send out a trigger signal to the logic circuit 19 and the electronic switch 6, and the closed loop feedback bypass control subsystem for the short-circuit liquid bridge current is turned on. In a very short period before the explosion of the liquid bridge, the liquid bridge current has been rapidly bypassed and reduced to the low preset current value with the closed loop feedback control mode, and the low current is maintained until the liquid bridge is broken smoothly without any explosion and spatter under high current.

Figure 8:
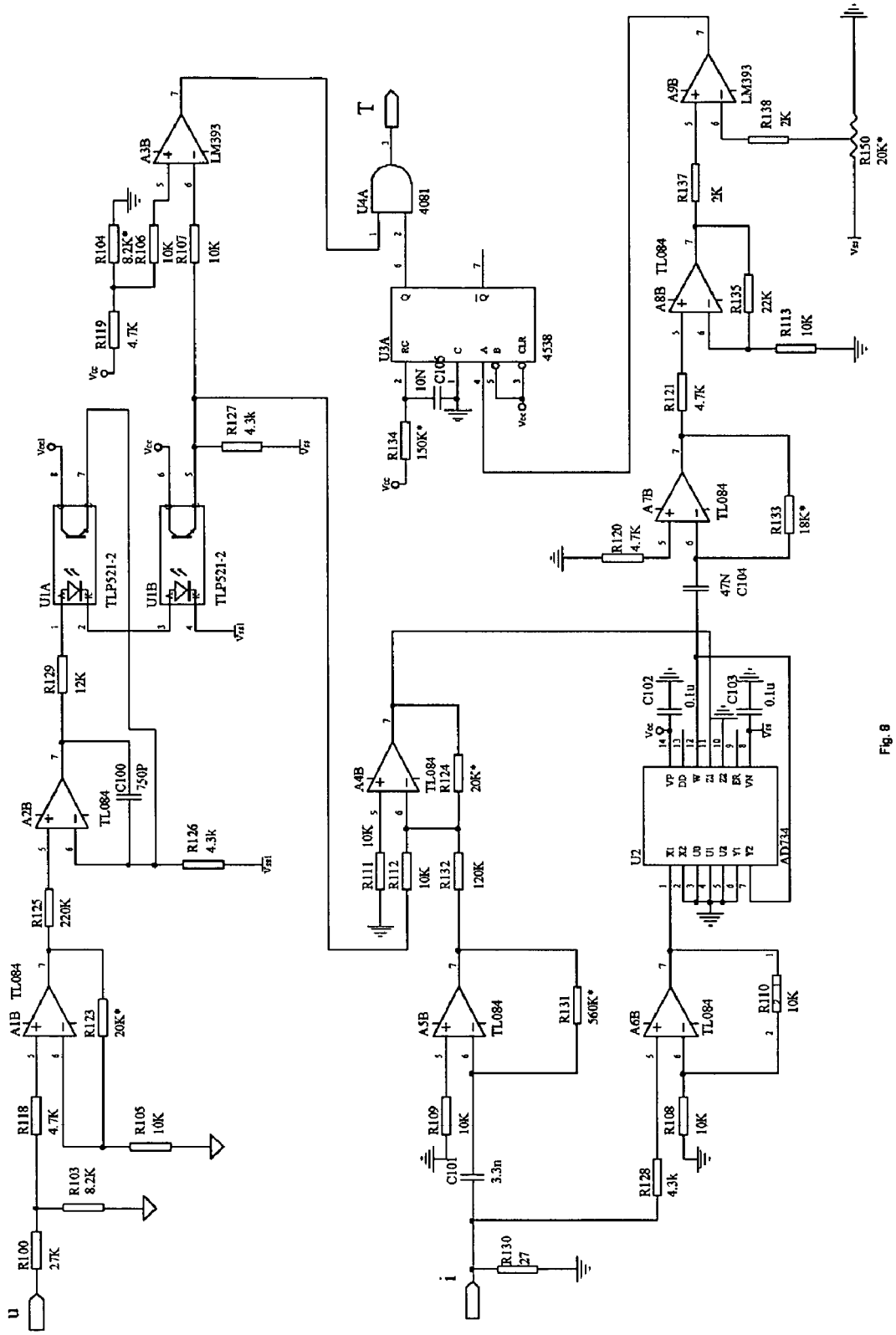
FIG. 8 is a circuit diagram of the short-circuit liquid bridge state detecting and estimating subsystem.
Figure 8:
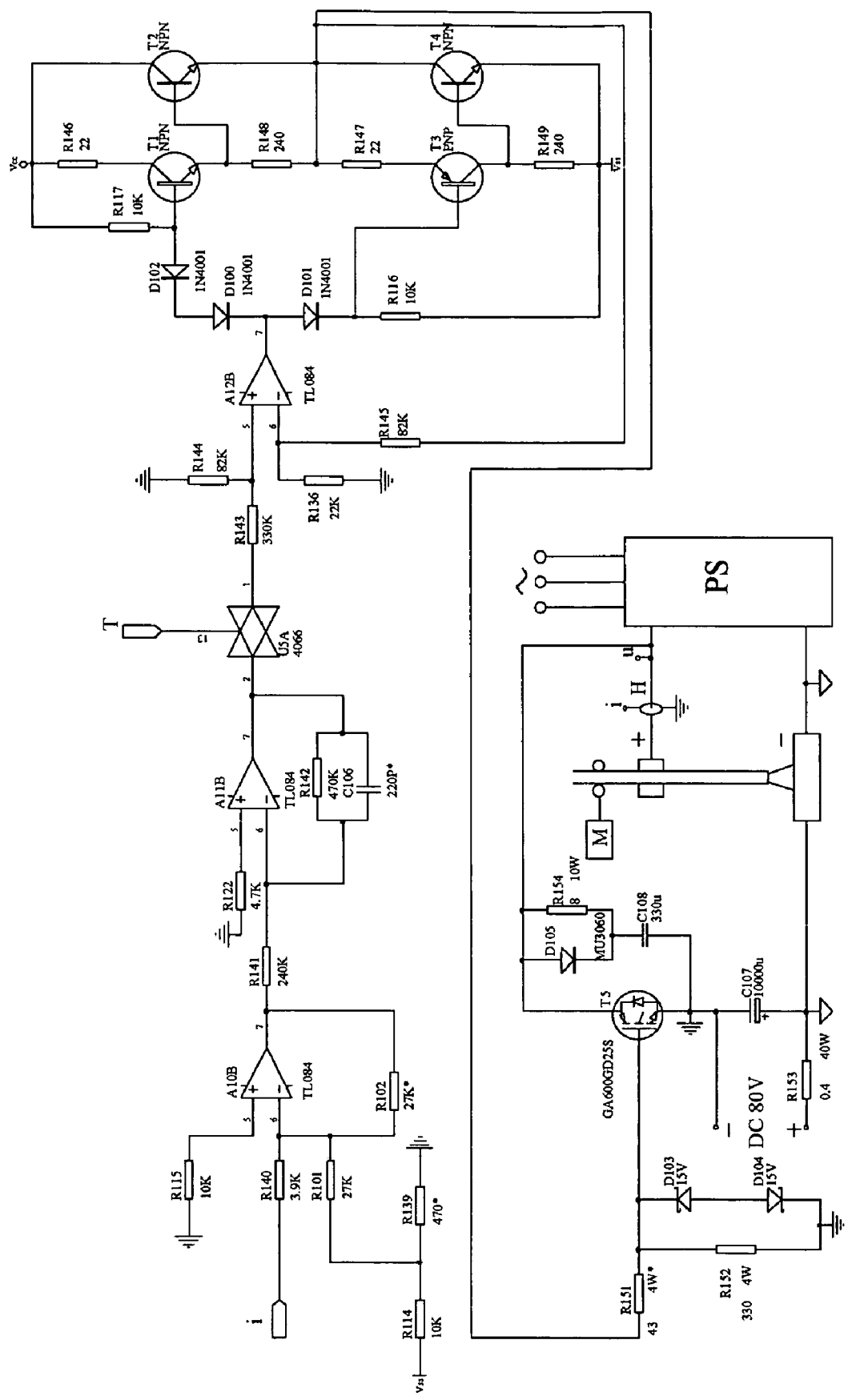

The resistance changing rate of the welding circuit loop can be detected by either software or hardware. FIG. 8 shows an application of the detection of the short-circuit liquid bridge shrinkage state or the resistance changing rate of the welding circuit loop. The liquid bridge current is supplied to a differentiator A5B and an amplifier A4B to realize calculation of $$U_R £ U_h 1/2 R_1 C_1 \frac{di}{dt}$$

and obtain the voltage drop of the equivalent resistance of the welding circuit loop $U_R$, where $R_1=R_{131}$ and $C_1=C_{101}$. Then the welding loop current i and the voltage drop of the equivalent resistance of the welding circuit loop $U_R$ are input to a division operator U2 to complete the calculation of $U_R/I=R$. The equivalent resistance obtained in this way is supplied to a differentiator A7B to get the resistance changing rate of the welding circuit loop $$\frac{dR_h}{dt},$$

which indicates the state or the diameter of the shrinking liquid bridge. A comparator A9B compares the resistance changing rate of the welding circuit loop with the preset value, when the resistance changing rate reaches the preset value, the comparator A9B will send out a pulse to trigger a monostable trigger U3A. The closed loop bypass control subsystem for the short-circuit liquid bridge current is turned on by a logic circuit U4A, and the liquid bridge current is reduced to a low level and the low level is maintained until the liquid bridge is broken.

In the liquid bridge shrinkage state detection above, a compensation method is applied to obtain the equivalent resistance changing rate of the welding circuit loop. But the result of experiment research and quantitative analysis indicates that, if the short circuit liquid bridge current increases exponentially, i.e., $i=\Delta I(1-e^{-t/\tau})$, then after the compensation term $$L_2 \frac{di}{dt}$$

is divided by the value of the current i and the quotient is differentiated with respect to time, the result $$\left| \frac{d}{dt}\left( \frac{L_2}{i} \frac{di}{dt} \right) \right|$$

is a very small constant term and can be neglected. So the liquid bridge state or diameter in short-circuit shrinkage process can be represented and described by the impedance (including equivalent resistance and inductance) changing rate of the welding circuit loop $$\frac{dZ_h}{dt}.$$

The larger the impedance changing rate of the welding circuit loop $$\frac{dZ_h}{dt}$$

is, the smaller the liquid bridge diameter is.

In the equivalent circuit diagram of the welding circuit loop shown in FIG. 5, there is a relationship of:

$$U_h = L_2 \frac{di}{dt} + iR_L + iR_S + iR_Y$$

The equivalent impedance of the welding circuit loop is obtained by:

$$Z_h = \frac{U_h}{i} = \frac{L_2}{i}\frac{di}{dt} + R_L + R_S + R_Y$$

The impedance changing rate of the welding circuit loop is obtained by:

$$\frac{dZ_h}{dt} = \frac{d}{dt}\left(\frac{L_2}{i}\frac{di}{dt}\right) + \frac{dR_L}{dt} + \frac{dR_S}{dt} + \frac{dR_Y}{dt}$$

If the welding circuit loop parameters are introduced, $$\frac{dZ_h}{dt}$$

is approximately 10 times larger than $$\left| \frac{d}{dt}\left( \frac{L_2}{i} \frac{di}{dt} \right) \right|.$$

So $$\left| \frac{d}{dt}\left( \frac{L_2}{i} \frac{di}{dt} \right) \right|$$

can be neglected. Using the impedance changing rate of the welding circuit loop $$\frac{dZ_h}{dt}$$

to represent the diameter or the state of the short-circuit liquid bridge is an accurate, effective and practical way.

If the impedance changing rate of the welding circuit loop $$\frac{dZ_h}{dt}$$

is used for estimating the diameter of the short-circuit liquid bridge, the first differentiator 13 in the short-circuit liquid bridge state detecting and estimating subsystem should be canceled. The current and voltage signals of the welding circuit loop are directly sent to the division operator 8 to get the equivalent impedance of the welding circuit loop, and then the impedance is supplied to the second differentiator 9 to get the impedance changing rate of the welding circuit loop. The impedance changing rate is compared with preset value from 12. If the impedance changing rate of the welding circuit loop is higher than preset value from 12, the comparator 11 will send out a pulse passing the logic circuit 19 to turn on the electric switch 6 of the closed loop feedback bypass control subsystem for the short-circuit liquid bridge current. As a result, the subsystem is activated and the liquid bridge current is reduced to a very low level rapidly. The low level current will be maintained until the liquid bridge is broken. When the short-circuit/arc condition detector 15 receives the arc condition signal and the electric switch 6 is turned off by the logic circuit 19.

The liquid bridge state preset value from 12 is the critical value of the resistance changing rate or the impedance changing rate of the welding circuit loop for turning on the closed loop feedback bypass control subsystem for the short-circuit liquid bridge current. The preset value from 12 corresponds to the critical liquid bridge diameter at the moment when the closed loop feedback bypass control subsystem for the short-circuit liquid bridge current is turned on. In a preferred embodiment, the preset value is about 5.8 mΩ/ms. This preset value will affect the length of the current bypass control period. When the bypass control period is normally about 0.4-0.8 ms, it indicates the liquid bridge state preset value is reasonable.

The closed loop feedback bypass control subsystem for the short-circuit liquid bridge current should only be turned on during the short-circuit period. In order to avoid the false turn-on of the bypass control subsystem, the short-circuit/arc condition detector 15 is provided in the short-circuit liquid bridge state detecting and estimating subsystem. If the liquid bridge finishes the transfer process and the arc condition state appears, the output of the short-circuit/arc condition detector 15 is of zero electric level, and the electronic switch 6 is switched off by the logic circuit 19, so the closed loop feedback bypass control subsystem for the short-circuit liquid bridge current is turned off automatically. So, when the liquid bridge finishes the transfer smoothly under low current and enters the arc condition state, the bypass control subsystem will be automatically turned off and wait for the next turn-on trigger. As soon as the liquid bridge breaks and enters the arc condition state, the bypass circuit branch is switched off by the short-circuit/arc condition detector 15 via the logic circuit 19 and the electronic switch 6.

When the present invention is applied to a rectifier style power source of welding machine, the rectifier phase changing or the turn-on of the controlled rectifier device may result in the sudden change in the welding current and voltage. These sudden changes disturb the detecting and estimating of the short-circuit liquid bridge state, and may even leads to false judgment of the short-circuit liquid bridge state detecting and estimating subsystem. Especially at the moment of phase-changing point of the rectify power source, the current changing rate $$\frac{di}{dt}$$

is very large, so are $$L_2 \frac{di}{dt}$$

and $$\left| \frac{d}{dt}\left( \frac{L_2}{i} \frac{di}{dt} \right) \right|.$$

Figure 6:
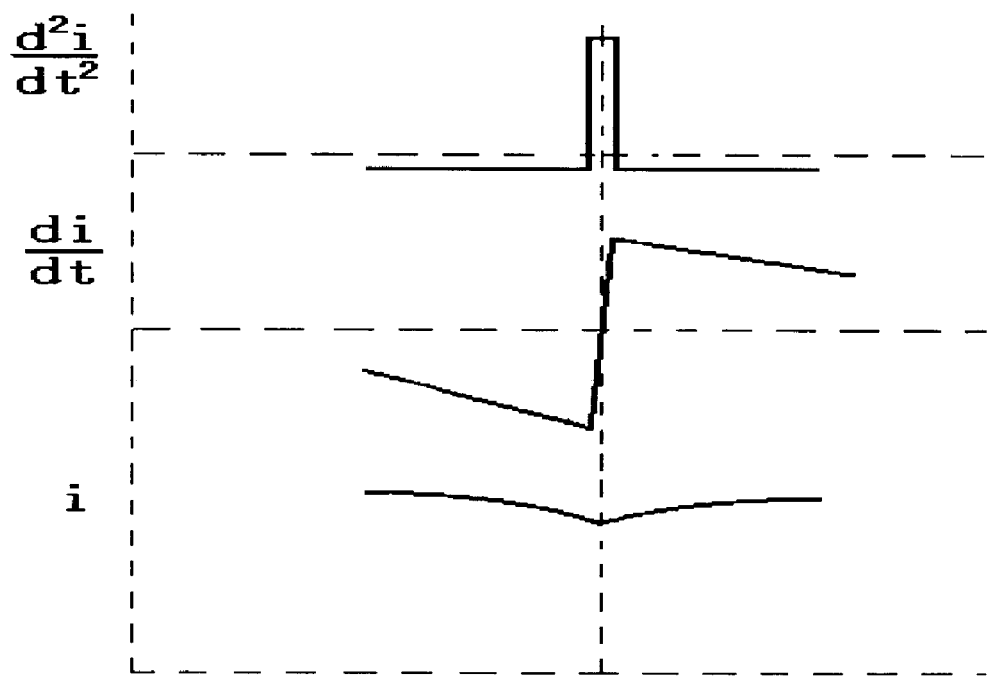
FIG. 6 is a waveform of the current, the differential of the current, and the second-order differential of the current with respect to time during the phase current changing from one phase to another in the rectified style welding power source.

The disturbance in the detection of the resistance changing rate of the welding circuit loop $$\frac{dR_h}{dt}$$

or the impedance changing rate of the welding circuit loop $$\frac{dZ_h}{dt}$$

is so high that it can only be avoided by a blocking method. In the short-circuit liquid bridge state detecting and estimating subsystem, a third differentiator 16 and a fourth differentiator 17 are used for calculating the second-order differential of the current with respect to time. This second-order differential is input to the trigger 18 to get a 0.25 ms block delay time, which blocks the disturbing noise by the logic circuit 19 for the above delay time, so as to avoid the false judgment of the short-circuit liquid bridge state detecting and estimating subsystem during the rectify phase changing moment. The waveforms of the current, and the differential and the second-order differential of the current with respect to time near the phase changing point are shown in FIG. 6. The above blocking method is also effectual for avoiding the disturbance caused by the turn-on of the rectify device.

Due to the iron core DC inductance $L_1$ inside the welding power source, the output current changing may result in over voltage. In the circuit transition process of the current changing, the energy discharged from the inductance $L_1$ equals to $$\frac{1}{2}(\Delta i)^2 L,$$

and the energy that can be absorbed and stored in the capacitor in the absorption circuit equals to $$\frac{1}{2}C(\Delta U_c)^2.$$

After the capacitor absorbs the energy discharged from the inductance $L_1$, the voltage increment $\Delta U_c$ of the capacitor can be calculated from the equation $$\frac{1}{2}\pounds\Delta i \pounds^2 L = \frac{1}{2}\copyright C(\Delta U_c)^2.$$

Figure 7:
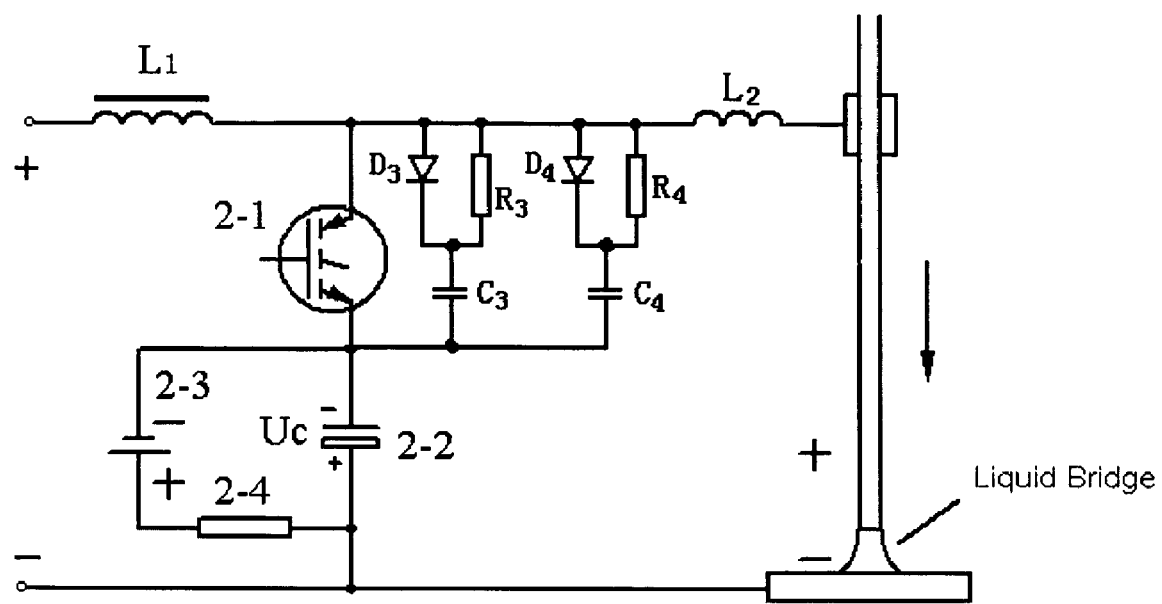
FIG. 7 is a circuit diagram of the over-voltage absorption protection for the power module of the bypass circuit branch.

It is very necessary to have a sufficient capacitance C to absorb the energy and to make sure the voltage will not be increased to exceed the safety working voltage of the power module 2-1. Meanwhile, in order to reabsorb the energy discharged from the inductance in next cycle, the discharge time constant of the absorption circuit should not be too high and the capacitor should be drained before the next over voltage. Because the bypass circuit branch and the liquid bridge circuit branch are in parallel connection and the bypass circuit branch works in a very short time in every cycle, and because $L_1$ is very large, only the current distribution percent between these two circuit branches is changed when the bypass circuit branch is turned on. There is no substantive change in the output current of the welding power source, so the energy released from the inductance $L_1$ and the over voltage is not very large in this condition. Similarly, during the normal melting drop transfer, the current peak value, the value of $$\frac{di}{dt}$$

or the over voltage is not very high, so that only a small capacitance is needed to absorb those energies. However, when the welding arc starts or the accidental short-circuit takes place during welding, the value of $$\frac{di}{dt}$$

and the over voltage are both very high because the short-circuit period is much longer and the short-circuit current decreases suddenly after it increases to an extreme high level. Under this condition, a huge capacitance is needed for absorbing the energy discharged by iron core DC inductance $L_1$ to depress the over voltage. To adapt the two extreme conditions mentioned above, the present invention uses two absorption circuits, shown in FIG. 7, with the absorption circuits having much different capacitances and discharge time constants, to absorb the over voltage caused by the circuit transition process of normal melting drop transfer and the turn-on/off of the bypass circuit branch, as well as the over voltage caused by the circuit transition process of welding arc starting and accidental short-circuit in welding. In the first absorption circuit $R_3$-$D_3$-$C_3$, shown in FIG. 7, a capacitance $C_3$ is relatively small, and the discharge time constant $R_3C_3$ is much smaller than the time interval of the activation of the bypass circuit branch or the melting drop transfer cycle, usually under the ⅓ of each of these two intervals. So, every time after the melting drop transfer or the bypass circuit branch activation, the capacitance C3 has enough time for discharging. But this small capacitance is not enough to absorb the over voltage generated by the circuit transition process of arc starting and the accidental short-circuit in welding. The second absorption circuit $R_4$-$D_4$-$C_4$ has a larger capacitance $C_4$. Its capacity is so high that it can absorb the over voltage caused by the circuit transition process of arc starting or the accidental short-circuit in the welding. Its discharge time constant $R_4C_4$ is relatively longer, that is, usually 3 to 5 times longer than the melting drop transfer cycle or the time interval of the activation of the bypass circuit branch. So under these conditions, most of the energy or electric charge in capacitance $C_4$ could not be discharged during the melting drop transfer cycle or the time interval of the activation of the bypass circuit branch and the voltage of the capacitance $C_4$ is almost equal to the peak voltage of the first absorption circuit. The capacitance $C_4$ does not absorb the over voltage caused by the circuit transition process of the melting drop transfer or the on/off of the bypass circuit branch. When the arc starting or the accidental short-circuit in the welding takes place, the capacitance $C_4$ starts to be charged because the extreme high over voltage, the energy discharged from the iron core DC inductance is absorbed, and the over voltage is depressed. The frequency of the arc starting or the accidental short-circuit in the welding is very low and the time interval is very long. Even the time constant $R_4C_4$ is much larger than $R_3C_3$, it is still much smaller than the time interval of the arc starting or the accidental short-circuit in the welding, that is, usually ⅕ to ⅓ of them, and the over voltage in every time of the arc starting or the accidental short-circuit can be absorbed. An electrolytic capacitance can be used as $C_4$ due to its very low working frequency.

For the two extreme situations mentioned above, an over-voltage absorption protection circuit is connected to the power module 2-1 in parallel. The over-voltage absorption protection circuit is composed of two absorption circuits, the capacitances and discharge time constants of which are in huge difference, to absorb the over voltage caused by the circuit transition process of the normal drop transfer and the turn-on/off of the bypass circuit branch and the over voltage caused by the circuit transition process of the arc starting and the accidental short-circuit. For the protection circuit which absorbs the over voltage caused by the circuit transition process of the normal drop transfer or the turn-on/off of the bypass circuit branch, the following way is used for selecting the capacitance value and the circuit parameters: after absorbing the energy released from the inductance $L_1$ of the welding power source during the circuit transition process of the normal drop transfer or the turn-on/off of the bypass circuit branch, the capacitor voltage does not exceed the safe voltage of the power module 2-1 and the discharge time constant of the protection circuit does not exceed the ⅓ of the drop transfer cycle time or the bypass activation cycle time. For the protection circuit which absorbs the over voltage caused by the circuit transition process of the arc starting or the accidental short-circuit, the following way is used for selecting capacitance value and the circuit parameters: after the absorbing the energy released from the inductance $L_1$ of the welding power source during the circuit transition process of the arc starting or the accidental short-circuit, the capacitor voltage does not exceed the safe voltage of the module 2-1. The discharge time constant of the circuit should be much greater than the normal drop transfer cycle time or the activation cycle time of the bypass circuit branch, such as 3 times or more, and the discharge time constant of the circuit does not exceed the ⅓ of the interval time of the accidental short-circuit in the welding or the short-circuit interval for the arc starting.

In a preferred embodiment, the parameters of the absorption circuit for absorbing the over voltage generated by the circuit transition process of the normal melting drop transfer or the turn-on/off of the bypass circuit branch are set as: $R_3$=8 Ω, $C_3$=25 μF, and the discharge time constant is 200 μS; and the parameters of the absorption circuit for absorbing the over voltage generated by the circuit transition process of the arc starting or the accidental short-circuit in the welding are set as: $R_4$=100 Ω, $C_4$=330 μF, and the discharge time constant is 33 ms. The differences in both the capacitances and time constant between the two absorption circuits are distinct.

In the present invention, the short-circuit liquid bridge diameter is estimated by detecting the resistance changing rate $$\frac{dR_h}{dt}$$

or the impedance changing rate $$\frac{dZ_h}{dt}$$

of the welding circuit loop during the welding process. When the short-circuit liquid bridge diameter reaches the critical value, the liquid bridge current is rapidly reduced to a low level by the current bypass control of the bypass circuit branch and the low level current is kept until the liquid bridge breaks. As a result, it enables the liquid bridge to be transferred gently under a low level current, and the welding spatter can be reduced greatly.

EXAMPLES

FIG. 8 shows the basic circuit diagram of the short-circuit liquid bridge state detecting and estimating subsystem. The function of the subsystem is to detect and estimate the short-circuit liquid bridge state during shrinkage process. The resistance changing rate of the welding circuit loop or the impedance changing rate of the welding circuit loop is introduced to represent the diameter or the state of the short-circuit liquid bridge during the bridge shrinkage process, and they are compared with a preset value. If The resistance changing rate or the impedance changing rate of the welding circuit loop reaches the critical preset value, a trigger will be sent out to turn on the closed loop feedback bypass control subsystem for the short-circuit liquid bridge current.

The circuit works in the way as described below.

The voltage u is measured at the output of the welding power source, and the liquid bridge current i is detected by the current sensor in the welding circuit loop. The circuit for the measurement of the voltage of the power source should be isolated from the circuit of the short-circuit liquid bridge state detecting and estimating subsystem because the circuit for the measurement of the voltage of the power source does not share the same ground with the short-circuit liquid bridge state detecting and estimating subsystem. The voltage passes through the amplifier A1B and the linear isolator which comprises an amplifier A2B, the photoelectric coupling isolators U1A and U1B, and then it is input to an amplifier A4B for subtracting calculation. The current i passes through a differentiator A5B and is differentiated with respect to time and reversed to be negative, then it is calculated with $$U_R = U_h - RC\frac{di}{dt}$$

in the amplifier A4B.

where $U_h$ is the output voltage of the welding power source;

$$RC\frac{di}{dt}$$

is the output voltage of the amplifier A5B, which is equivalent to the voltage of the welding cable's inductance, here, R is R131, C is C101; and $U_R$ is the output voltage of the amplifier A4B, which is the equivalent resistance voltage of the welding circuit loop.

U2 is a division operator in which the calculation of the equivalent resistance of welding circuit loop $R=U_R/i$ is carried out. The voltage of the equivalent resistance of the welding circuit loop $U_R$ is input to a terminal Z1 of the division operator U2. After the liquid bridge current i passes through an amplifier A6B, it is input to the terminal X1 of the division operator U2, and the $U_R$ is divided by i. The value of the equivalent resistance of the welding circuit loop can be obtained from the output terminal W of the division operator U2. The equivalent resistance of the welding circuit loop passes through a differentiator A7B, and the differential signal of the equivalent resistance with respect to time is obtained, and the differential signal can represent the diameter of the liquid bridge at this moment. Because the signal is very weak, and it is amplified by an amplifier A8B. Then the above result is compared with the preset value of the liquid bridge state or the liquid bridge diameter (provided by the potentiometer R150) in the comparison operator A9B. In the later period of the liquid bridge shrinkage, when the liquid bridge becomes thin enough, the differential value of the welding circuit loop resistance with respect to time will reach or exceed the preset value. The comparison operator A9B will send out a pulse instantly to trigger a monostable trigger U3A which will generate a rectangle pulse. The width of this rectangle pulse is equal to the potential maximum width of the bypass control period, set as 1.5 ms. The real and final turn-on width of the bypass circuit branch is determined by the liquid bridge shrinkage process, when the liquid bridge is broken, the bypass control subsystem can be automatically turned off. This function is obtained by a comparison operator A3B and a AND gate U4A. A3B is a short-circuit/arc condition detector. If the voltage value is lower than the preset value (decided by the potentiometer circuit of R119 and R104), the welding circuit loop state is in the liquid bridge short-circuit condition and the output of comparison operator is in high-level voltage. The bypass control turn-on pulse can pass through the AND gate U4A to trigger an electric switch U5A in the FIG. 9. Then the closed loop feedback bypass control subsystem for the short-circuit liquid bridge current is turned on to reduce and control the short-circuit liquid bridge current before the liquid bridge is broken. Once the liquid bridge is broken and the welding arc enters the arc condition, the arc voltage becomes higher than the preset value of the short-circuit voltage, and the output of the comparison operator A3B becomes to a low voltage level.

At this moment, the low voltage level of the output of the comparison operator A3B blocks out the trigger signal, no matter the output of the monostable trigger U3A is. Thus, the turn-on pulse for the bypass control subsystem will be cut off or blocked off when the liquid bridge is broken and the welding arc enters the arc condition. The short-circuit/arc condition detector can also block the disturbance in the period of arc condition so as to avoid the possible miss turn-on of the bypass control subsystem.

When the impedance changing rate of the welding circuit loop is used for detecting and estimating the diameter of the short-circuit liquid bridge and used as the basis to turn on the closed loop feedback bypass control subsystem for the short-circuit liquid bridge current, only the liquid bridge current differentiator A5B is needed to be canceled from the subsystem. Then the signals of the current and the voltage of the welding circuit loop directly enter the inputs of the division operator U2 to calculate the impedance of the welding circuit loop. The impedance passes through the differentiator A7B to obtain the impedance changing rate of the welding circuit loop. After it is amplified by the amplifier A8B, compared with the preset value in the comparison operator A9B, and triggers the trigger U3A, the trigger pulse for the turn-on of the bypass control subsystem is available.

When this method is applied to the controlled rectifier style welding power source, in order to avoid the interference to the short-circuit liquid bridge state detecting and estimating subsystem and lead to the missjudgement, a second-order differential signal of the current of the welding circuit loop with respect to time is used for blocking the electric interference to the short-circuit bridge state detecting and estimating subsystem caused by the phase current changing from one phase to another or the turn-on of a controlled rectified device. The welding current passes through two differentiators, the second-order differential signal of the current triggers a 0.25 ms monostable trigger, then it's reverse output is sent to the input terminal of a logic circuit U4A so as to block the interference caused by the current phase changing and the turn-on of the controlled rectified device and avoid the misjudgment of the short-circuit liquid bridge state detecting and estimating subsystem.

FIG. 9 shows the circuit diagram of the closed loop feedback bypass control subsystem for the short-circuit liquid bridge current, it is applied to reduce and control the short-circuit liquid bridge current rapidly during the later period of short-circuit bridge shrinkage process, and enable short-circuit liquid bridge to transfer softly under a very low current. PS is the welding power supply; M is a welding wire feeding motor. The bypass circuit branch comprises a power module T5 and a charged capacitor C107, and the bypass circuit branch is connected in parallel with the two output terminals of welding power source. The closed loop feedback bypass control subsystem for the short-circuit liquid bridge current is a closed loop feedback control system with the liquid bridge current as a feedback quantity. The turn-on of this system is depended on the electric level of output terminal T of the short-circuit liquid bridge state detecting and estimating subsystem shown in FIG. 8, and the closed loop feedback bypass control subsystem for the short-circuit liquid bridge current is turned on or off by the electric switch U5A. The preset value of the liquid bridge current control is determined on the shared voltage set by R114 and R139. The liquid bridge current signal is obtained from the welding current sensor, and sent as the system feedback quantity to an amplifier A10A, in which the feedback value and the preset value is compared and the difference is amplified. As the corrector of the current feedback control subsystem, A11B corrects the system dynamic response. The driver circuit of the power module T5 comprises an amplifier A12B, transistor T1, T2, T3 and T4. The power module is an IGBT power module or MOSFET power module. It is used to bypass or shunt the current of the short-circuit liquid bridge. The current can be reduced from the short-circuit peak value to a very low preset level in a very short moment, so as to reduce the welding spatter. In the bypass circuit branch, the charged capacitor C107 is inserted in series with the power module for accelerating the current declining rate, and when current enters the steady state, it supplies the power module T5 enough voltage to make T5 working in the linear amplifying state to continue the liquid bridge current control. The principle is shown in FIG. 2 and the above description.

There has thus been shown and described a novel method and system for reducing spatter in short-circuit transfer gas shielded arc welding which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for reducing spatter in short-circuit transfer gas shielded arc welding, wherein the resistance changing rate or the impedance changing rate of the welding circuit loop is detected for estimating the diameter of the short-circuit liquid bridge;

wherein when the resistance changing rate or the impedance changing rate increases and reaches a preset threshold value which indicates that the diameter of the liquid bridge has shrunk and decreased to a critical diameter, a bypass circuit branch connected in parallel to the welding circuit loop is turned on, to bypass the liquid bridge current rapidly, so as to decrease the liquid bridge current to a low level and keep the current at this level until the liquid bridge is broken, which result in a gentle and smooth transfer of the liquid bridge in a low current level condition.

2. The method of claim 1, wherein the turn-on of the bypass circuit branch is determined on the basis of the resistance changing rate of the welding circuit loop, and the resistance changing rate is detected and calculated in the following way:

the output voltage of the welding power source is subtracted by a term which is equal to the equivalent voltage drop of welding cable inductance, then the value obtained by said subtracting is divided by the value of the current of the welding circuit loop, and the value obtained by said dividing is differentiated with respect to time, with the result of the differentiating being the resistance changing rate of the welding circuit loop.

3. The method of claim 1, wherein the turn-on of the bypass circuit branch is determined on the basis of the impedance changing rate of the welding circuit loop, and the impedance changing rate is detected and calculated in the following way:

the output voltage of the welding power source is divided by the value of the current of the welding circuit loop, and the value obtained by the dividing is differentiated with respect to time, with the result of the differentiating being the impedance changing rate of the welding circuit loop.

4. The method of claim 1, wherein when the method is applied to a controlled rectifier style welding power source, a second-order differential signal of the current of the welding circuit loop with respect to time is used by a short-circuit bridge state detecting and estimating subsystem, for blocking the electric interference to the short-circuit bridge state detecting and estimating subsystem caused by the phase current changing from one phase to another or the turn-on of a controlled rectified device.

5. The method of claim 1, wherein in the bypass control process of the short-circuit liquid bridge current, a current closed loop feedback bypass control mode with the liquid bridge current as a feedback quantity, is used for reducing and controlling the current in the later period of the liquid bridge and in the earlier period of the arc time after the bridge is broken.

6. The method of claim 1, wherein a capacitor is connected in series into the bypass circuit branch of a closed loop feedback bypass control subsystem for the short-circuit liquid bridge current; the capacitor is charged before the turn-on of the bypass circuit branch, so as to provide a sufficient voltage for accelerating the bridge current decreasing rate; and when the bridge current reaches a steady state, the voltage of the capacitor provides a power module of the bypass circuit branch with a sufficient voltage for maintaining the power module in a linear amplifying state, so as to control the liquid bridge current during the bypass control period.

7. The method of claim 1, wherein an over-voltage protection circuit, which is connected in parallel to the power module of the bypass circuit branch, is composed of two absorption circuits which have both capacitances and discharge time constants in huge difference for absorbing the over voltage caused by the circuit transition process of the normal drop transfer and the turn-on/off of the bypass circuit branch and the over voltage caused by the circuit transition process of the arc starting and accidental short-circuit;

wherein for the protection absorption circuit which absorbs the over voltage caused by the circuit transition process of the normal drop transfer and the turn-on/off of the bypass circuit branch, the following way is used to select the capacitance value and the circuit parameters: after absorbing the energy released from the inductance ($L_1$) of the welding power source during the circuit transition process of the normal drop transfer and the turn-on/off of the bypass circuit branch, the capacitor voltage does not exceed the safe voltage of power module, and the discharge time constant of the protection circuit does not exceed the ⅓ of the drop transfer cycle time or the bypass activation cycle time; and for the absorption protection circuit which absorbs the over voltage caused by the circuit transition process of the arc starting or accidental short-circuit, the following way is used to select capacitance value and the circuit parameters: after the absorbing the energy released from the inductance ($L_1$) of the welding power source during the circuit transition process of the arc starting and accidental short-circuit, the capacitor voltage does not exceed the safe voltage of module, and the discharge time constant of the protection circuit should be much greater than the normal drop transfer cycle time or the bypass activation cycle time, such as 3 times or more, and the discharge time constant of the protection circuit does not exceed the ⅓ of the interval time of accidental short-circuit including the short-circuit for arc starting.

8. A system for performing the method of claim 1, comprises two subsystems, i.e., a short-circuit liquid bridge state detecting and estimating subsystem and a closed loop feedback bypass control subsystem for the short-circuit liquid bridge current;

wherein the short-circuit liquid bridge state detecting and estimating subsystem comprises a short-circuit/arc condition detector, a liquid bridge current sensor, a first differentiator, a voltage adder, a division operator, a second differentiator, a short-circuit liquid bridge diameter pre-setter, a comparator, a third differentiator, a fourth differentiator, a trigger, and a logic circuit;

the output of the short-circuit liquid bridge state detecting and estimating subsystem turns on or off the closed loop feedback bypass control subsystem for the short-circuit liquid bridge current with an electrical switch; and the closed loop feedback bypass control subsystem for the short-circuit liquid bridge current comprises a liquid bridge current pre-setter, the liquid bridge current sensor, an error signal correction amplifier, the electrical switch, a power module driver, the bypass circuit branch, and the welding circuit loop with the short-circuit liquid bridge.

* * * * *